(12) United States Patent
Song et al.

(10) Patent No.: US 12,302,448 B2
(45) Date of Patent: May 13, 2025

(54) RESCUE SYSTEM

(71) Applicant: T-MOBILE INNOVATIONS LLC, Overland Park, KS (US)

(72) Inventors: Jim Song, Suwanee, WA (US); Sarah Lynn O'Brien, Seattle, WA (US); Darrin Michael Lea, Mandeville, LA (US); Henry Vy, Woodruff, SC (US); Paulyn Ladignon Monasterio, Tucker, GA (US); Eric Steven Hill, Frisco, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 441 days.

(21) Appl. No.: 17/566,007

(22) Filed: Dec. 30, 2021

(65) Prior Publication Data

US 2023/0217544 A1 Jul. 6, 2023

(51) Int. Cl.
| | |
|---|---|
| *H04W 76/50* | (2018.01) |
| *G01S 13/46* | (2006.01) |
| *G05D 1/00* | (2006.01) |
| *G06F 1/3212* | (2019.01) |
| *G06F 1/3234* | (2019.01) |
| *H04M 1/73* | (2006.01) |
| *H04W 4/12* | (2009.01) |
| *H04W 4/80* | (2018.01) |
| *H04W 4/90* | (2018.01) |
| *H04W 52/02* | (2009.01) |

(52) U.S. Cl.
CPC ............ *H04W 76/50* (2018.02); *G01S 13/46* (2013.01); *G05D 1/0088* (2013.01); *G06F 1/3212* (2013.01); *G06F 1/3265* (2013.01); *H04M 1/73* (2013.01); *H04W 4/12* (2013.01); *H04W 4/80* (2018.02); *H04W 4/90* (2018.02); *H04W 52/0219* (2013.01); *H04W 52/027* (2013.01); *G01S 2013/468* (2013.01)

(58) Field of Classification Search
CPC ......... H04W 76/50; H04W 4/12; H04W 4/80; H04W 4/90; H04W 52/0219; H04W 52/027; H04W 4/029; G01S 13/46; G01S 2013/468; G05D 1/0088; G06F 1/3212; G06F 1/3265; H04M 1/73; H04M 1/72424; H04M 1/72418; G08B 25/016
See application file for complete search history.

(56) References Cited

U.S. PATENT DOCUMENTS

| | | | |
|---|---|---|---|
| 2014/0155098 A1* | 6/2014 | Markham | ................. H04L 1/22 455/456.3 |
| 2018/0012471 A1* | 1/2018 | Bauer | ................... H04W 4/029 |
| 2018/0183920 A1* | 6/2018 | Celik | ................ H04M 1/72436 |
| 2019/0232908 A1* | 8/2019 | Wang | ..................... H04W 4/90 |
| 2020/0196372 A1* | 6/2020 | Ouyang | .................... H04R 5/04 |

* cited by examiner

*Primary Examiner* — Said M Elnoubi

(74) *Attorney, Agent, or Firm* — Shook, Hardy & Bacon L.L.P.

(57) ABSTRACT

In emergency or search-and-rescue operations, user devices such as phones may transmit signals that indicate people may be located nearby. The signals can be detected by one or more rover devices, which can explore dangerous terrain for indications of people to be rescued. The user devices can activate an application that conserves battery power while emitting a signal, in some cases in a round robin configuration to further conserve power. The rover devices, or other devices that make contact with the user devices, can collect and manipulate data about the user devices to aid a rescue operation.

20 Claims, 16 Drawing Sheets

FIG. 13

— STATE —

Now, define the attribute(s) and their values. Attributes that render to blank values will be ignored. You may reference the state updates by payload path, JSON template or individual field input.

Data Method

Individual Fields

Attribute: act
Value: {{data.act}}

Attribute: btr
Value: {{data.btr}}

Attribute: conn
Value: {{data.conn}}

Attribute: dist
Value: {{data.dist}}

Attribute: geo
Value: {{data.geo}}

Attribute: id
Value: {{data.id}}

RESCUE SYSTEM

BACKGROUND

Unfortunately, in some situations, people can become lost or trapped in various circumstances. For example, a person or a team may work or live in conditions that can become dangerous, isolated, or without access to emergency services. As one example, a group of people can explore or work in a remote cave or underground area, or in dense wooded areas. In another example, a vehicle such as a bus or train may become stranded or wrecked. In such circumstances, it can be difficult to locate or search for individuals. It may be hard to know where missing people are located, and it may be too dangerous to explore certain areas. For instance, a structure may not be stable, or there may be a risk of exposure to hazardous materials. When people are in an emergency situation, they may have limited means of communication, or limited device power to use in attempts to communicate. Even if some people have access to communication devices (and are in a condition where they are able to use their devices), the devices do not work together to conserve power and transmit communication, to aid in their location or rescue.

SUMMARY

Embodiments of the present disclosure are directed towards providing systems for locating people in distress. In embodiments, the people can be associated with devices, such as mobile devices, which communicate with each other and optimize the remaining battery power of the devices. In some embodiments, one or more rover devices can be deployed, for example in connection with a search or rescue operation. Rover devices can be used for triangulation and/or trilateration of signals from user devices, for example, and the rover devices can explore areas that may be unsafe or unreachable for other individuals, such as emergency personnel.

BRIEF DESCRIPTION OF THE DRAWINGS

FIG. 13 depicts an example of an interface associated with some implementations of the present disclosure, in accordance with various embodiments.

FIG. 14 depicts an example of an interface associated with some implementations of the present disclosure, in accordance with various embodiments.

FIGS. 17A and 17B depict examples of portions of code used by devices, such as a rover device, in accordance with some embodiments of the present invention.

DETAILED DESCRIPTION

Figure 1:
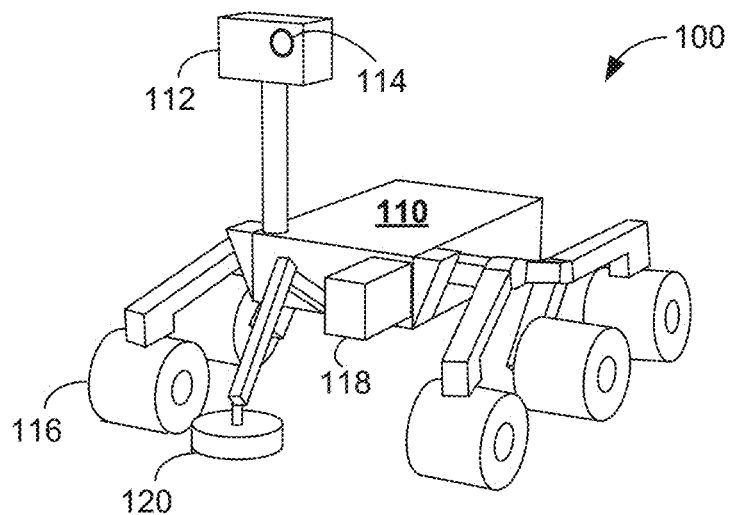
FIG. 1 depicts an example configuration of a rover device in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, a person or a group of people may need to be located, or they may need to be able to communicate with others. For example, a set of people may be working in or exploring a dangerous area, or an area may become dangerous due to an accident or disaster. In some cases, a person may become lost or unreachable. In various situations, people may need to communicate with emergency help. In some situations, a structure may unstable or partially collapsed, or people may be underground or trapped. It is possible a person may not be visible to other people, such as a search operation or emergency responders. A person may be trapped underneath objects or barriers, or otherwise out of a line of sight. A person may also be incapacitated in some way and unable to speak or call out for help. For example, debris from an accident or mudslide, or other event, could interfere with locating victims. In some cases, it may not be clear to responders whether any people are located in a certain area or not.

In embodiments described herein, one or more people can use a device, such as a phone, to request assistance. In some cases, the device itself may request assistance. As discussed below, embodiments of the present invention enable people to reach out for help. In some cases, the use of power by the devices is optimized, for example to preserve battery power of cellular phone device. Devices associated with people can communicate with one or more rover devices, to locate or rescue the people. In some cases, the rover devices can explore areas that are too dangerous or remote for human search operations.

As one example, if a building is not structurally safe for emergency personnel to enter, rover devices could be used to check the building for people. The rover devices could attempt to locate end user devices, such as phones, associated with people. In some cases, the rover devices operate by remote control or in an autonomous or semi-autonomous mode. The rover devices may be able to transmit information about signals from devices, to be used for triangulation and/or trilateration of the signals. In this example, the rover devices may be used to determine the precise locations of end user devices, such as phones.

In another example, a manufacturing accident may cause toxic chemicals to contaminate an area. The chemicals may have caused one or more employees to become unconscious. A rover device may be able to maneuver in areas inaccessible to people, for example due to size, temperature, or exposure to hazardous chemicals or conditions. The rover device may be able to detect one or more users of devices in a facility. One or more rover devices may provide the locations of the users to a system, so the users can be reached or monitored, for example. In some cases, a rover may be able to detect what levels of hazardous chemicals, if any, exist in the same area as the users.

Turning to FIG. 1, an example of a rover device 100 is shown. A rover device, in accordance with embodiments, can be various shapes or sizes and can include various components. In the rover device 100 in FIG. 1, a body 110 is shown. A body 110 of a rover device 100 can include one or more upper components, such as upper component 112, as shown in FIG. 1. The upper component 112 can extend higher than the body 110 of a rover device 100. In some cases, an upper component 112 is permanently extended above the body 110 of the rover device 100, while in some cases an upper component 112 can be raised higher based on the needs of a rover device 100 or the preferences of a remote user. An upper component 112, if included, may include a sensor 114. A sensor 114 can be a camera or camera lens, for example a camera device or a phone or other device with a built-in camera. In some cases, a sensor 114 can include a magnification or focus aspect, and/or a laser or other guidance to aid a remote user viewing information using the sensor 114. In embodiments, upper component 112 can turn or be turned to face any direction.

A rover device 100 may also include transport extensions, such as transport extension 116 shown in FIG. 1. A transport extension 116 may be a wheel that turns and/or a leg or appendage that can step or climb to navigate obstacles. As illustrated in the example in FIG. 1, a rover device 100 may include four or six transport extensions 116, in some cases with two or transport extensions 116 branching from or attached to one piece that extends outwardly from body 110 of the rover device 100. The transport extensions 116 can comprise relatively wide and/or flat wheels or rollers, which may aid the rover device 100 in staying upright and moving while on uneven or treacherous terrain. In some cases, an extension 118 from body 110 of rover device 100 can be attached to a detector 120. A detector 120 can be used to receive or detect information, such as signals from user devices, audio noise, chemical signatures, or other data. In embodiments, the component illustrated as detector 120 can be used to steady or plant a rover device 100, so that the rover device 100 can obtain precise coordinates or other information about user devices or the landscape. A rover device 100 can be equipped with software components, such as an application, as discussed in more detail below. A rover device 100 is not required to implement embodiments of the present invention. But the use of two or more rover devices, such as rover device 100, can receive data regarding signals or noise from two or more locations, so that people or user devices can be located in space, as discussed below.

Figure 2:
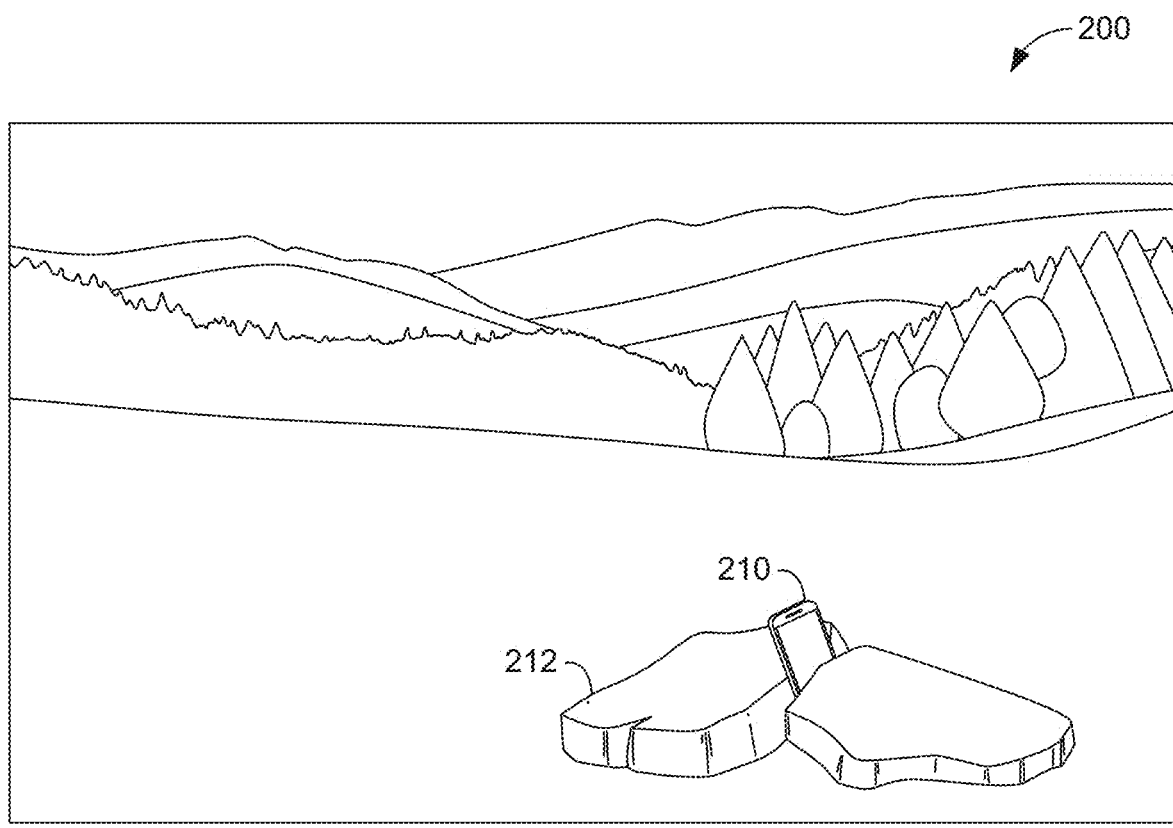
FIG. 2 depicts an example configuration of an end user device in which some implementations of the present disclosure can be employed, in accordance with various embodiments.

Turning to FIG. 2, an example of an area 200 is shown. An example of a user device 210 is also shown in FIG. 2. A user device 210 can be a phone or tablet device, for example, or another electronic or computing device capable of communications. In some cases, a user device 210 may be separated from a user by a certain distance, but it may still be helpful to locating one or more people. In the example in FIG. 2, the area 200 can include objects such as rock 212, which a user device 210 may impact when dropped. As shown in FIG. 2, the terrain of area 200 can be uneven, with various elevations and other obstacles that may impede locating people or user devices (e.g., user device 210). A user device 210 can be a wearable electronic device, such as a watch or armband capable of executing software. In some cases, discussed in more detail below, a user device 210 may be out of reach of a user, or inaccessible.

Figure 3:
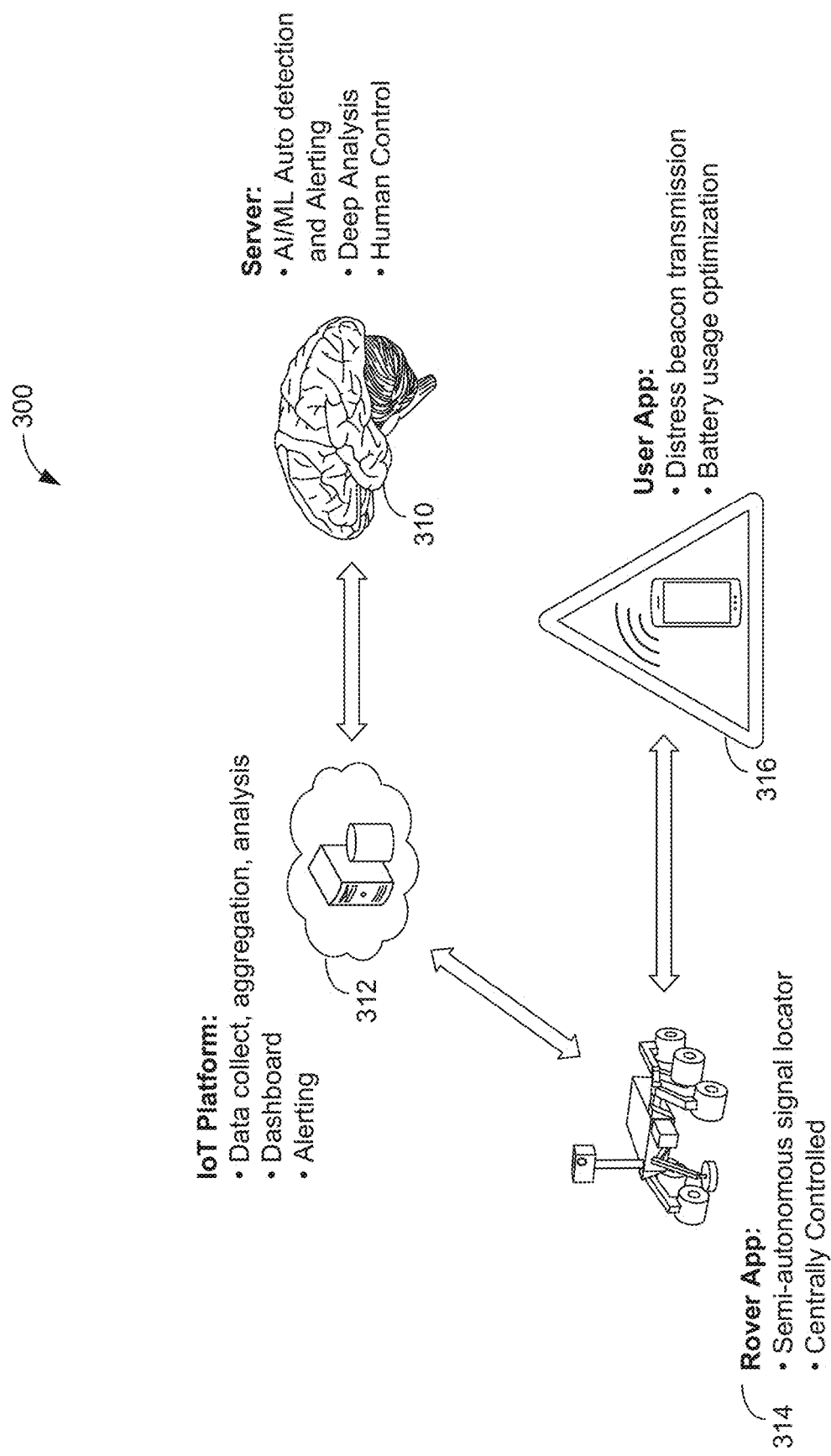
FIG. 3 depicts an example diagram showing a configuration of components in communication, which can be used with some implementations of the present disclosure, in accordance with various embodiments.

FIG. 3 shows an example of a system 300, which can include one or more of the components illustrated in FIG. 3. For example, a system 300 can include a server 310, which may comprise a single server 310 or a distributed server 310 across more than one machine or device. As shown in FIG. 2, a server 310 can interact with other components of a system 300. In some cases, a server 310 can accessed over a network to provide analysis of data received by other parts of the system 300, such as an Internet of Things (IoT) platform 312. In embodiments, a server 310 can be used to provide a user options for controlling aspects of a system 300, for example by generating an interface or options or preferences for selection by a user. Server 300 can power or perform operations of the IoT platform 312. For example a dashboard displaying events related to end user devices can be provided via an IoT platform 312, as executed by or provided from the server 300.

A server 300 may enable artificial intelligence and/or machine-learning techniques to be applied to improve auto-detection or alerting by the system 300. For example, a server 300 can include components that are trained using data, over time, to develop or improve the detecting performed by devices such as a rover device 100 in FIG. 1. For example, after training and/or after rescue missions, a server 300 can include software for deducing certain conditions to be tested for or detected in certain circumstances. As one example, a system 300 can learn if a first rover device 100 detects a dangerous chemical, additional rover devices should activate sensing equipment for the same chemical. As another example, if a first rover device 100 detects heat from a certain direction, an upper component 112 of the rover device can automatically turn to obtain camera data of the source of the heat. In some cases, artificial intelligence and/or machine learning can be used to learn the types of audible noise a rover device 100 should pursue in a given situation, for example which noises are most likely to be associated with a person or an emergency. These are just examples of the types of detection that may be learned or implemented by a server 310 within a system 300. In some cases, a server 310 may be trained to identify situations where an alert or notification should be provided to a user of the system 300, such as a noise or communication indicating a person or device may have been located.

The IoT platform 312 in FIG. 3 is shown in communication with the server 310 and a rover application 314. An IoT platform 312 is able to both send and receive data from a server 310 and a rover application 314, in the example in FIG. 3. A rover application 314 may communicate with an IoT platform 312 and a user application 316. In some embodiments, for example if no rover device 100 is used, a server 310 can communicate with an IoT platform 312 and/or a user application 316.

An IoT platform 312 can collect information from a rover application 314. In embodiments, two or more rover applications 314 are used on two or more rover devices, such as rover device 100, and data from multiple rover devices is collected by the IoT platform 312. The data from one or more rover applications 314 is aggregated and analyzed at an IoT platform 312, in some cases. The IoT platform 312 may be used to provide a dashboard or to implement alerts. A rover application 314 can continuously transmit information to the IoT platform 312, such as telemetry. This information can indicate the location of a rover device 100, the detected sounds, visible information, characteristics such as chemical traces or exposures, temperature, or information about one or more user devices 210 detected by the rover device 100. The continuous data received by an IoT platform 312 allows for event detection in the data, which may represent a found user device 210, or a new condition in an area 200 for consideration.

As shown in FIG. 3, a rover application 314 may comprise, in embodiments, a semi-autonomous, or autonomous, signal locator, and components for central control of rover devices, such as rover device 100. Also as shown in FIG. 3, a user application 316 can be used to transmit beacon signals, such as distress signals, and for battery optimization. The applications and platform described herein may be software applications or other software or program components executed by devices, which may be pre-installed on a device or downloaded or added by a user, for example.

A rover application 314, as shown in FIG. 3, may be embodied on a component of a rover device 100 as shown in FIG. 1. For example, a rover device 100 may have an electronic device with a rover application 314 affixed to, or included within, the rover device 100. One or more parts of a rover device 100 can store or execute a rover application 314, in embodiments. In some cases, a rover application 314 may be installed on a rover device 100. In some cases, a server 310 may utilize an IoT platform 312 to push or provide instructions, such as a rover application 314, to a rover device 100.

Figure 17B:
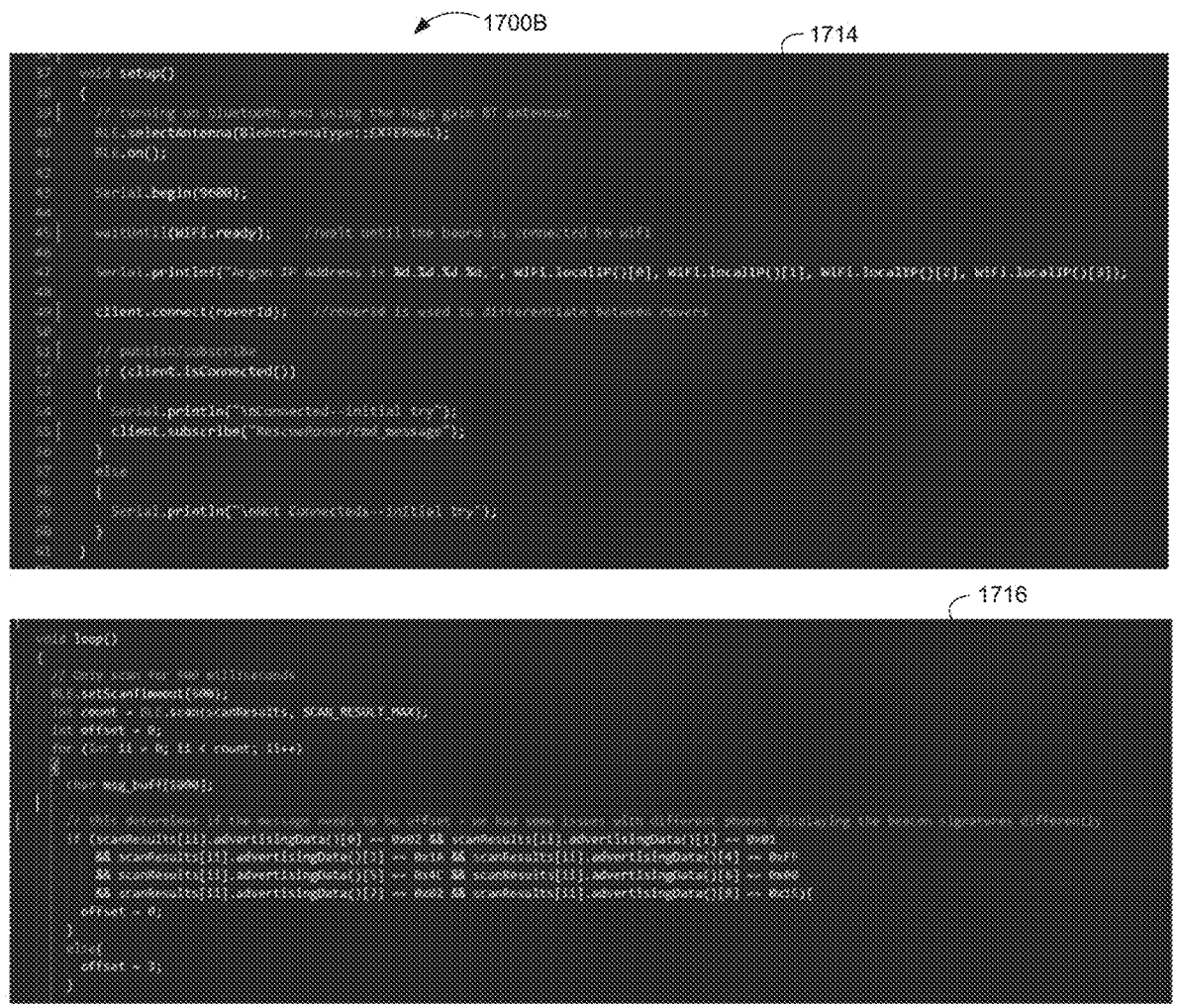

A rover application 314 may be on Android application, for example, based on a Java programming language, but other types of applications or programs could be used. In some cases, Termux may be used to install python programming language capabilities. A rover application 314 can provide wireless connectivity and/or USB serial port(s). In embodiments, a rover application 314 run on a Particle.io Argon microcontroller. In some cases, a rover application 314 can use a Bluetooth low energy (BLE) antenna, such as a high gain omni and directional antenna, for example, so a rover device 100 can detect signals. In one example, an upper component 112 of a rover device 100 can contain an antenna, or another part or extension of the rover device 100 may be an antenna. An Argon application or component of a rover application 314 can provide constants for receiving Bluetooth signals from devices, such as a user device 210. A rover device 100 may be programmed to establish an object based on scanning for Bluetooth signals using an antenna. For example, a BleScanResult object may be generated or stored by a rover application 314, which may include a value indicting the maximum number of Bluetooth devices detected in a scan by a rover device 100. An example of a portion of code relating to embodiments performing these aspects can be found at 1710 in FIG. 17A.

The rover application 314 may include an MQ Telemetry Transport (MQTT) client, to communicate with MQTT server technology, in embodiments. This may provide MQTT connectivity for an Argon board associated with rover device 100. A "RoverID" may be a unique value associated with each rover device 100. In embodiments, an identification of a peripheral device, in the code for a rover application 314, can be a Losant device, such as an IoT platform 312. A server variable can be set to an IP address of device, such as an Android phone device, running an MQTT service. The rover application 314 may also include an MQTT client( ) line, where the application can pass values to create an MQTT client, and a callback used by the MQTT client is created. An example of a portion of code relating to embodiments performing these aspects can be found at 1712 in FIG. 17A.

In embodiments, an MQTT client can be used to set up functions for an Argon board associated with a rover device 100. A rover application 314 can indicate use of an external Bluetooth antennae and turn on the BLE antenna, and begin a serial connection. In some cases, the rover application 314 may wait until wireless connectivity is active to continue. The rover application 314 may include a client_connect (roverid) function, to connect to an MQTT client using the unique RoverID, for example. In some cases, an "if-else" statement notifies a system 300 whether an Argon board was able to connect to the MQTT technology as part of a setup process. An example of a portion of code relating to embodiments performing these aspects can be found at 1714 in FIG. 17B.

If no connection is made, the rover application 314 may continue to attempt to connect using a loop function. For example, a loop function can initiate a scan, such as a BLE scan, for 500 milliseconds (as one example of a time period), then loop through all devices found in the scan (scanResults). The first part of the loop may be conditional and check if data needs to be offset. For example, data from each BLE-detected device comes in a series of bytes. For instance, the signals an Argon board associated with a rover device 100 will receive may be iBeacon signatures from user devices that have a user application 316. Some user devices may cut-off the first few bytes of an iBeacon preamble when broadcasting a signal, so a conditional process can check if the data at the beginning of the payload is consistent with the iBeacon packet structure. If it is not consistent, the data may be offset at the start of the message so it will align properly. An example of a portion of code relating to embodiments performing these aspects can be found at 1716 in FIG. 17B.

In embodiments, the loop function described above continues. In some cases, data payloads may be dived into usable segments. For example, a first if-statement may check if a major and a minor identification of an incoming BLE payload are equal to the major and minor identifications set up in a user application 316. If they are equal, a rover application 314 may set up a char variable (for example, as msg_buff) to the data from the BLE message, which may be split up into bytes so that associated indexes are per byte. If an offset value is used, it may be subtracted from each index so that right data is collected. In some cases, within a "sprintf" statement, data sections can be seen. For example, sections may include a universally unique identifier (UUID), a time activated, battery data, an activation mode, and bytes reserved for later use. An example of a portion of code relating to embodiments performing these aspects can be found at 1810 in FIG. 18A.

In embodiments, a rover application 314 may include instructions for sending data, using MQTT, to a Losant-based device, such as one or more devices hosting or providing an IoT platform 312. In some cases, the rover application 314 can implement instructions and thereby provide or print out data that was parsed, so it can be viewed at a terminal or interface, such as an open source PuTTy terminal. An Argon board associated with a rover device 100 can be connected to the MQTT technology and therefore may publish data to a Losant topic that has been specified (which can be set or changed to correspond to the identification of a peripheral device in Losant). If an Argon board is not connected to the MQTT technology, it may try to reconnect again immediately, continuously, or periodically. In some cases, the rover application 314 may delay for five seconds (or another predetermined value set as part of a delayFlag) to allow the board to reconnect to the MQTT technology if needed. An example of a portion of code relating to embodiments performing these aspects can be found at 1812 in FIG. 18A.

In some cases, two or more rovers can allow for accurate trilateration and triangulation of one or more user devices that are emitting a signal, or of audible noise or other signals or outputs. For example, a Received Signal Strength Indicator (RSSI) source approximation may be received by a rover device 100. A rover device 100 can include a directional antenna to isolate locations of devices transmitting signals, such as a user device 210. The information collected by the rover application 314 can be sent to a central collection site through or using the MQTT technology. In some cases, the rover device 100 has a high-capacity payload capability. For example, a rover device 100 may carry additional sensors for chemicals, gases, or amplifying sounds. A rover device 100 may employ high gain antennas for weaker signals. In embodiments, a rover application 314 can be powered by a phone device, such as an Android phone, with a multitude of sensors (such as accelerometers, global positioning system (GPS), compass, gyroscope, light detection and ranging (LIDAR), photometer, multiple cameras, barometer, proximity sensor, and microphone). In some cases, a microphone can be used to triangulate a source of sound associated with humans, such as a voice, breathing, a pulse, or other biological activity.

In embodiments, a rover device 100 may be stationary for periods of time, or it may be required to move periodically or continuously to cover significant areas, such as area 200. One or more rover devices (e.g., rover device 100) can be used to create or extend a network, such as a mesh network, which may expand the communication range in an area 200. In one example, a rover device 100 includes radio receivers or software-defined radios to receive or identify certain frequencies. User devices such as mobile phones may constantly transmit different signals in different frequency rangers, for example 2.4 Ghz or 5.0 Ghz for wireless communications, or GSM 1700/1900/2100 Mhz, or other outputted signals that a rover application 314 may detect and use as part of identifying a user device 210. In some cases, one or more drones can be implemented overhead, for example to locate signals, map out an area 200, or analyze routes for rover devices 100. This data may or may not be used as a rover device 100 utilizes machine learning to avoid or overcome obstacles in an autonomous mode.

The IoT platform 312 shown in FIG. 3 may be based on Losant technology. For example, an Internet of Things Proof of Concept (PoC) can be used to enable the IoT platform 312 described herein, in embodiments. The IoT platform 312 can provide an MQTT gateway, along with a dashboard for user viewing and manipulation, and alerting capabilities. In some cases, Losant provides a cloud-based IoT platform 312 for collecting data and performing analyses. For example, the live or near real-time data from one or more rover devices (e.g., rover device 100) can be collected at an IoT platform 312 and analyzed by a system 300. The examples of workflows in FIGS. 11 to 14, below, can access data and perform data manipulation.

In some cases, an IoT platform 312 can display the true meaning of an UUID. For example, data indicating an Activation Type is sent to a Losant device such as an IoT platform 312. The data may be sent or received as a hexadecimal or other value, and the IoT platform 312 may apply conditional logic or other processes to determine a usable meaning of the hexadecimal value. In embodiments, an IoT platform 312 may convert a value, such as an epoch time, to a human-readable value, such as human-readable time. An IoT platform 312 may calculates one or more distances (for example in meters) to or from an RSSI value.

An IoT platform 312 utilizing Losant, for example, may be able to display visual, real-time data in a dashboard interface. The dashboard may display user device battery levels at the start of a transmission, for example at the start time of a phone's iBeacon transmission. A dashboard may also provide information regarding the start time of a transmission, a time series chart of RSSI data and distance value(s), a total average of the RSSIs and distance value(s), historical locations or paths of rover device(s) 100, and a history table for each rover device 100, with the raw data collected over time. Aspects of a workflow that may be associated with one or more Losant-based devices, such as an IoT platform 312, is discussed in more detail with respect to FIGS. 11 to 14, below.

A user application 316, as shown in FIG. 3, can be a program or functionality present on any user device, for example a phone. Users can select to download and install a user application 316 on a computing device, such as a laptop, watch, or phone, for example, or the user application 316 may be available on a device when it is initially used or accessed. A user application 316 may be an Android application based on a java programming language and using low-energy Bluetooth (BLE), in one example, but other types of applications, languages, or technology frameworks can be used in accordance with embodiments of the present invention.

A user application 316 may be able to fully function, even without a network connection. The chances of a user application 316 being used to locate trapped or lost people, for example by a rescue team or a rover device 100, may be much higher if the user devices (e.g., user device 210) associated with the people do not require a network connection in order to operate. Therefore, even if no wireless connectivity or cellular connection is available, the user application 316 may still operate to provide assistance to an end user and/or emergency personnel, for example. The user application 316 can access and use information from a user device 210, such as location information (e.g., GPS coordinates), and microphone data. A user may give the user application 316 access or permission to access other data from the user device 210, including battery-related data.

Figure 4:
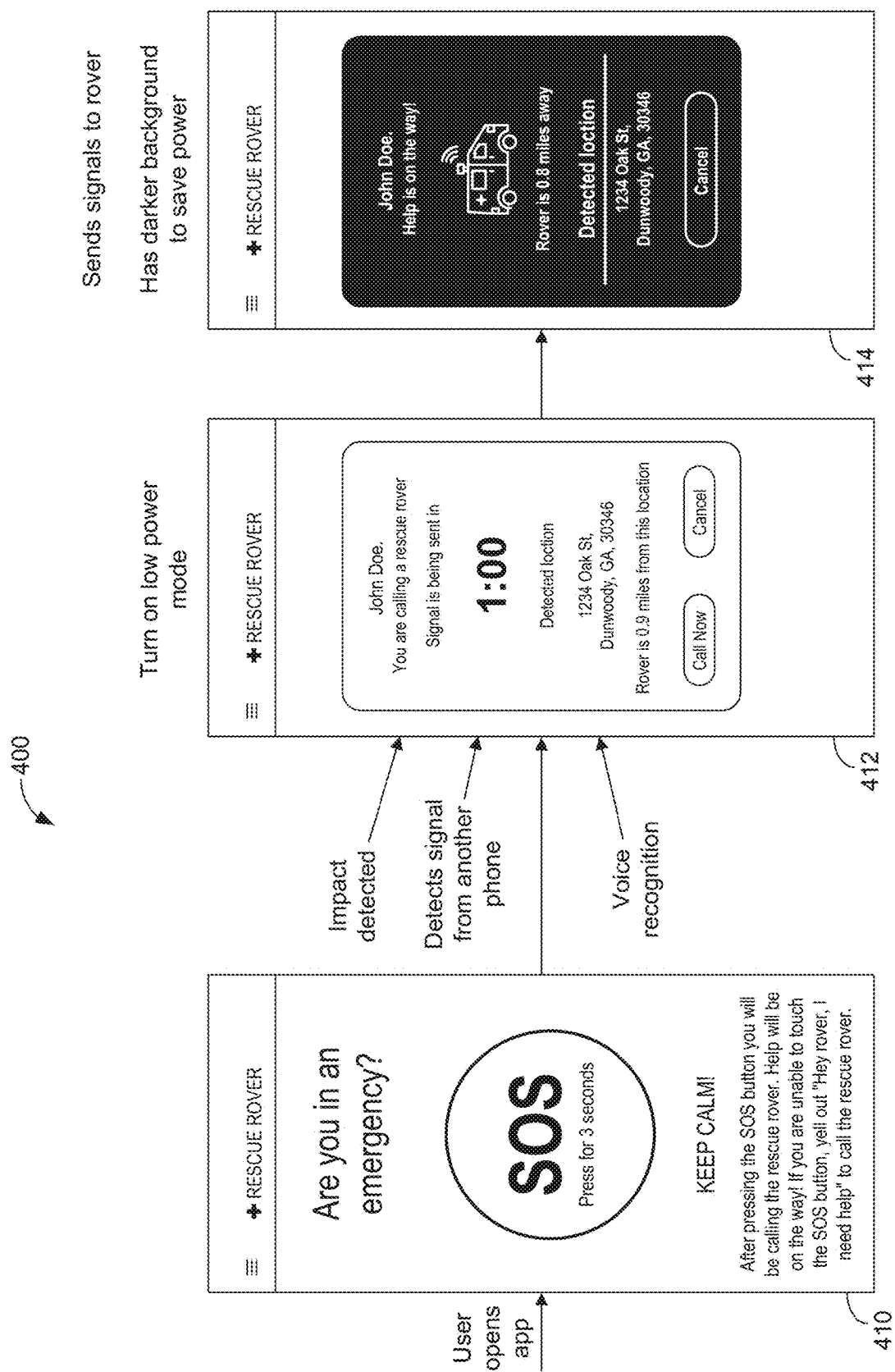
FIG. 4 depicts examples of user interfaces associated with some implementations of the present disclosure, in accordance with various embodiments.

In embodiments, when a user device 210 opens or accesses the user application 316, two different screen options may be presented. User may see two different screens, for example, depending on whether a user device 210 has a connection (such as cellular or WiFi), or if no connection is found. In FIG. 4, a series of interfaces 400 are shown as examples. In the first interface 410 in FIG. 4, a screen displays an "SOS" button for selection, and asks "Are you in an emergency?" The first interface 410 in FIG. 4 can be displayed when a user device 210 opens a user application 316, and the user device 210 does not have a network connection. The only option on the first interface is to select the "SOS" button, which may instruct a user to press or hold down the button for three seconds, or another amount of time. The exact text and timing of the interface options for user application 316 are not required, and variations may be used in embodiments. The example of a first interface 410 in FIG. 4 is provided merely to illustrate a main activity screen of user application 316. If a user device 210 has a network connection, then the first interface 410 may include an option to dial 9-1-1 or another emergency-services number underneath an SOS button, for example. This option can lead back to a user device 210 phone or dial pad, with 9-1-1 already keyed in or dialed for a user.

If a user selects an SOS button, this can trigger n animated visual effect and vibrations for each second passed while the user is holding down or selecting the button. This can alert the user that the selection is successful and how many seconds have passed, and it can aid in the user holding down the button for a long enough period of time to activate the selection. In embodiments, the time period may be longer or shorter than three seconds. The timing aspect, and the animations and/or vibrations, can ensure a user intends to select the button and understands the button has been selected (and must continue to be selected). This can reduce or eliminate inadvertent calls for help.

One a user has selected an SOS or other emergency option on a first interface 410, the user device 210 can be triggered to display a confirmation screen 412, as shown in FIG. 4. A confirmation screen 412 may include vibrations, ringtones, a timer, and text-to-speech and voice recognition capabilities, for example. As shown in the confirmation screen 412 in FIG. 4, a timer may indicate an amount of time remaining before a signal will be emitted by user device 210. A user may have an option to call now, instead of waiting for the time to expire, or to cancel the call. This confirmation screen 412 may further reduce any false positive calls, giving a user time to cancel the process.

As shown in FIG. 4, a conformation screen 412 may also be reached due to events such as an impact detected, or due to voice recognition. As one example, a user application 316 may learn or know the voice of a user of user device 210, such that the user's voice can activate the user application 316 and reach the confirmation screen 412, even if the user is unable to reach or manually activate the user application 316. For example, a user can audibly instruct a user device 210 such as a phone to open the user application 316. In another situation, a significant impact may be detected by a user device 210, which can cause the user application 316 to open or activate, and the confirmation screen to be displayed. In this example, a sensor relating to speed or acceleration in a user device 210 can trigger an impact detection, which may indicate a user has fallen, or that a vehicle associated with a user has been in a collision. A user may not be able to operate the user application 316 in this circumstance, but the confirmation screen 412 can still be reached and can still countdown and sent a signal, as shown in FIG. 4. A detected location can be displayed on a confirmation screen 412. An impact that is detected may cause a user application 316 to automatically open the application and navigate to a confirmation screen with a timer countdown until a signal will be transmit, and with the option to call 9-1-1 or to cancel, as shown at confirmation screen 412. At this point, a user application 316 can turn on a low-power mode, based on the activation of a signal due to an emergency or based on the detected battery power of one or more devices using a user application 316. An emergency or low-power mode may ping or transmit periodically to conserve power. At the confirmation screen 412, a user may select to cancel to return to the main activity screen shown at the first interface 410, or a user may select to transmit.

As shown in FIG. 4, if a selection is made to "call now," or if a timer expires, the user application 316 navigates from a confirmation screen 412 to a transmitting screen 414. The transmitting screen 414 can indicate that help is on the way, and/or that user application 316 is transmitting to other devices. At a transmitting screen 414, the option for a user may be to cancel, (if the user device 210 does not have a network connection, as shown) or a user may be able to either cancel or call emergency services using a dial pad (if the user device 210 has a network connection). In the example shown in FIG. 4, the transmitting screen 412 is reached automatically after sixty seconds expires. In some cases, the countdown may provide less or more time before transmitting. A transmitting screen 414 can use a dark background to conserve battery power, in some cases, and it can display if a rover device 100 is nearby and/or approaching a user device 210. The signal transmitted by a user device 210, as triggered by a user application 316, can be an iBeacon signal, in one example. Nearby devices can detect the signal, such as other devices with the user application 316, or other devices equipped to receive an iBeacon signal. Another type of signal could be transmitted to a rover device 100 in order to rescue a user of a user device 210.

In cases where a user device 210 has a network connection, such as cellular service or a wireless connection, a user application 316 may be automatically activated due to detection of a nearby beacon signal from another device. In some cases, a user's PIN may be required to access or activate a user application 316 or to enable certain aspects. When a PIN is successfully entered, and an iBeacon signal or an impact is detected, the user application may automatically open and present a confirmation screen, such as confirmation screen 412, with a countdown until a signal is transmitted. In some embodiments, no PIN is required.

In an example where no network connection is found, a user application 316 can display a message on an interface of user device 210 stating: "Nearby emergency beacon detected! Do you need help?" The interface can include a countdown and an option to cancel. If an impact is detected in a situation with no network found, a PIN may or may not be required, and a user application 316 may navigate directed to a confirmation page 412. In some cases, a voice alert or other verification can be implemented to ensure an emergency is actually occurring and to avoid false-positive calls to emergency services.

The iBeacon technology used in embodiments can be a protocol using iBeacon's UUID to provide user data including updated user data from a user device 210. For example, the data may include an activation type, a unique identifier, a battery status, a time of activation, and/or certain hexadecimal digits reserved for other data in the future (e.g., five hexadecimal digits may be reserved, in one example). A dynamic UUID can provide updates periodically to a system 300 regarding a user device 210, such as the status of battery life or other information. The iBeacon protocol may enable filtering capabilities based on the major and minor fields from the iBeacon protocol. This can be used to verify the system 300 is only picking up signals from user devices 210 that include a user application 316, for example, or other devices that were used to opt into services provided by a system 300. In some cases, an iBeacon detection will activate the user application 316 if other signals are transmitting iBeacon with the same, or recognized, major and minor values.

In embodiments, iBeacon data can include an activation type, which may indicate information, such as if manual activation occurred (where a user manually activated an emergency through the user application 316); if iBeacon activation was used (due to a user device 210 detecting a nearby iBeacon signal with the same major and minor values); or if an impact activation was used (for example, due to a sudden change in acceleration). The data may also indicate the available connectivity associated with a user device 210 (such as whether the user device 210 has connection to a WiFi or cellular network that may allow calls to 9-1-1 or nearby services). The data can indicate the responsiveness of a user associated with a user device 210, for example if a user responded before the countdown ran out or if the time expired. A response can confirm a conscious person affirmatively needs help. Otherwise, a lack of response may indicate a person is unconscious, or that no person is currently near the device. For example, in an accident, a user device 210 may end up several feet or more away from a user, but may still indicate an impact was detected and the user needs help, even though the user may be unable to operate the user device 210.

Figure 7:
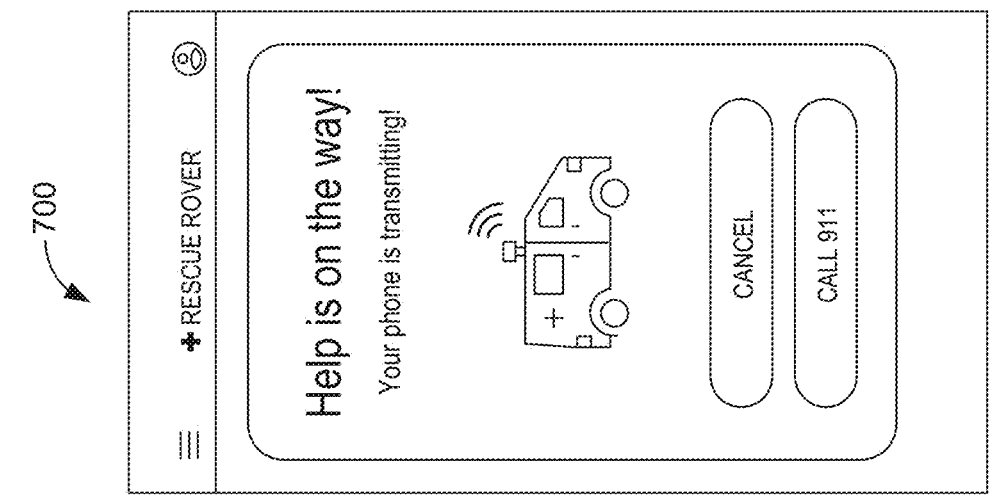
FIG. 7 depicts an example of a user interface associated with some implementations of the present disclosure, in accordance with various embodiments.
Figure 6:
FIG. 6 depicts an example of a user interface associated with some implementations of the present disclosure, in accordance with various embodiments.
Figure 5:
FIG. 5 depicts an example of a user interface associated with some implementations of the present disclosure, in accordance with various embodiments.

FIG. 5 shows an example of an interface 500 of a user application 316, as described herein, when a user has manually activated an emergency mode. For example, a user may open the user application 316 to automatically activate an emergency mode, or a user may select the mode or use voice control to initiate the mode. As shown, a signal can be set to be automatically transmitted after a period of time, such as one minute (or thirty seconds, etc.). FIG. 6 shows an example of an interface 600 where a user application 316 is activated due to detecting an emergency beacon nearby, such as another device's iBeacon signal. FIG. 7 represents an example of an interface 700, as described herein, where a user device 210 has a connection to a network, so the option to call 9-1-1 or to cancel both exist. FIG. 7 illustrates a user application 316 informing a user that their user device 210 is transmitting a signal. In embodiments, the signal is to be detected by a rover device 100, or a drone or other device. In some cases, where a rover device 100 is not employed, a rescue operation or other people may employ receivers or other devices to scan for or detect transmissions from a user application 316 requesting help.

Figure 8:
FIG. 8 depicts an example of a network, which can be used with some implementations of the present disclosure, in accordance with various embodiments.
Figure 9:
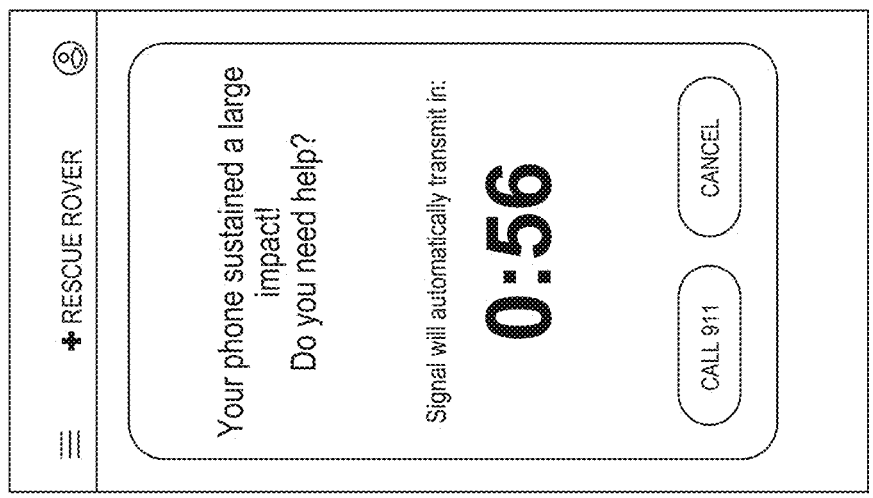
FIG. 9 depicts an example of a user interface associated with some implementations of the present disclosure, in accordance with various embodiments.

FIG. 8 illustrates another interface 800 of user application 316, for example where an impact event has been detected by a user device 210. In this case, a countdown may occur to automatically transmitting a signal from the user device 210, and an option to cancel the countdown and transmission exists. Additionally, here the user device 210 has a network connection, so the option to dial 9-1-1 using a dial pad exists. Another interface 900 of a user application 316 is shown in FIG. 9, with a message to a user indicating a nearby emergency beacon has been detected. A countdown is provided, along with an option to cancel. In this interface 900, the user device 210 is locked and requires a PIN, therefore the interface 900 instructs the user to dial 9-1-1 if help is needed.

Figure 10:
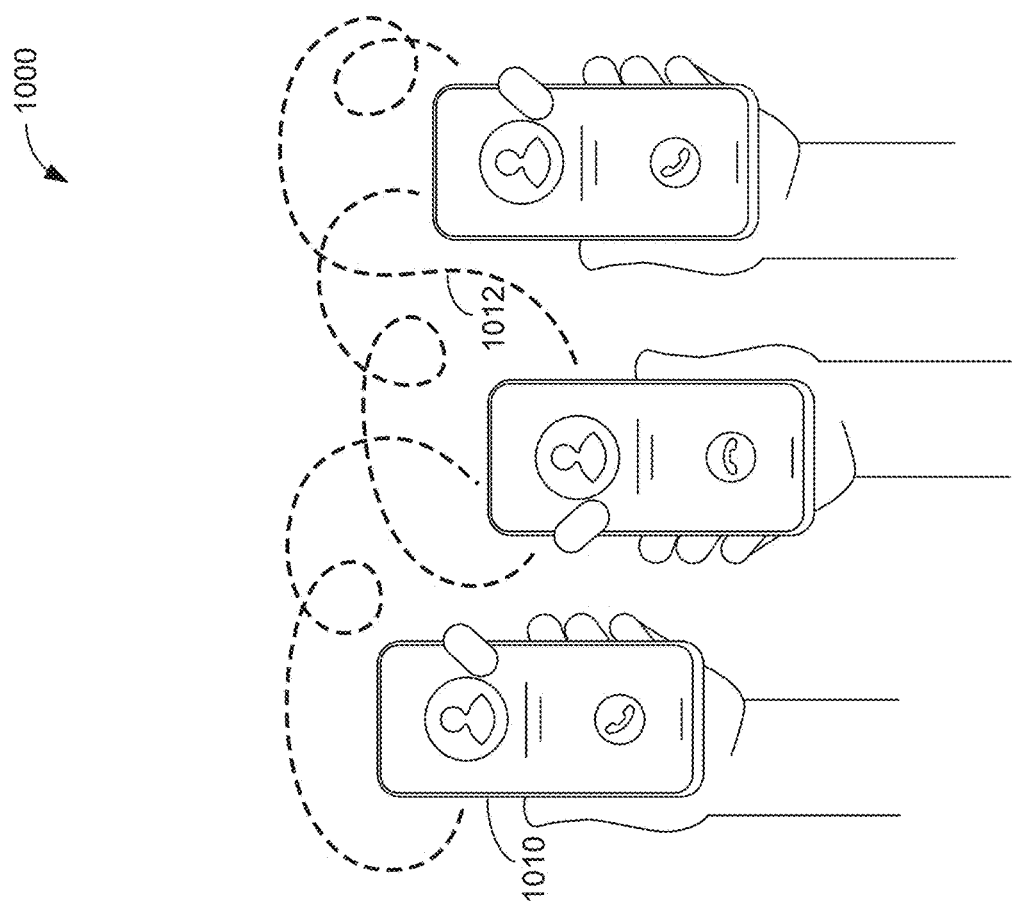
FIG. 10 depicts an example of a user interface associated with some implementations of the present disclosure, in accordance with various embodiments.

Turning to FIG. 10, the coordination or collaboration between multiple user devices, such as user device 210 and one or more additional devices, is illustrated. In FIG. 10, a first user device 1010 is illustrated, in direct communication with one or more other user devices. The devices can collaborate between multiple user devices and only transmit a BLE signal from one or more devices at a time (taking into account the battery life of other devices in the area and analyzing which devices should be transmitting based on relative, remaining battery power). In some cases, devices with user application 316 can create a two-way communication mesh network 1010 in an area such as a disaster zone. This can enable all of the user devices in the mesh network 1010 to be updated locations of rover devices and to notify each other when a rover device 100 has found a user device 210.

As described herein, each user device 210 with user application 316 can transmit a signal, which can be received by a rover device 100 (or multiple rover devices). The data from the rover devices can continuously be provided to an IoT platform 312, in some embodiments. An IoT platform 312 can implement a workflow to handle data from user devices, such as user device 210, as received from one or more rover devices (or from other instruments employed in the absence of rover devices).

Figure 11:
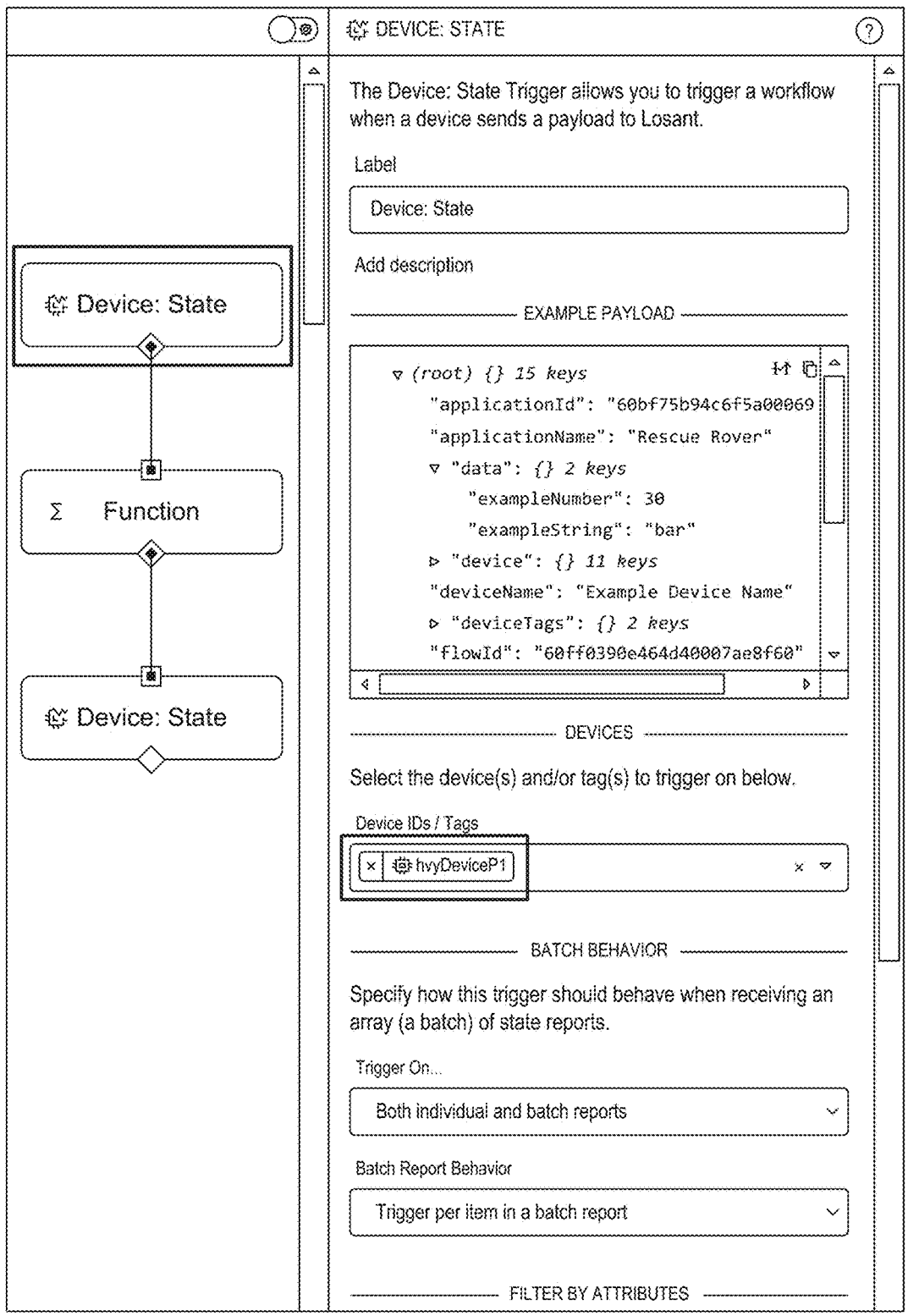
FIG. 11 depicts an example of an interface and flow diagram associated with some implementations of the present disclosure, in accordance with various embodiments.

Turning to FIG. 11, a first portion 1100 of a workflow for a Losant device is illustrated. As illustrated in FIG. 11, a "Device State" trigger can enable a user to cause a workflow when a device sends a payload to Losant (at an IoT platform 312). An example of a payload is shown in FIG. 11. The workflow and interface aspects shown in FIG. 11 are examples of formats and data that can be used in embodiments. The Losant workflow allows triggers to be set for specific events related to receiving records or payloads, for example. The information can be received and/or treated in batches by an IoT platform 312.

Figure 12:
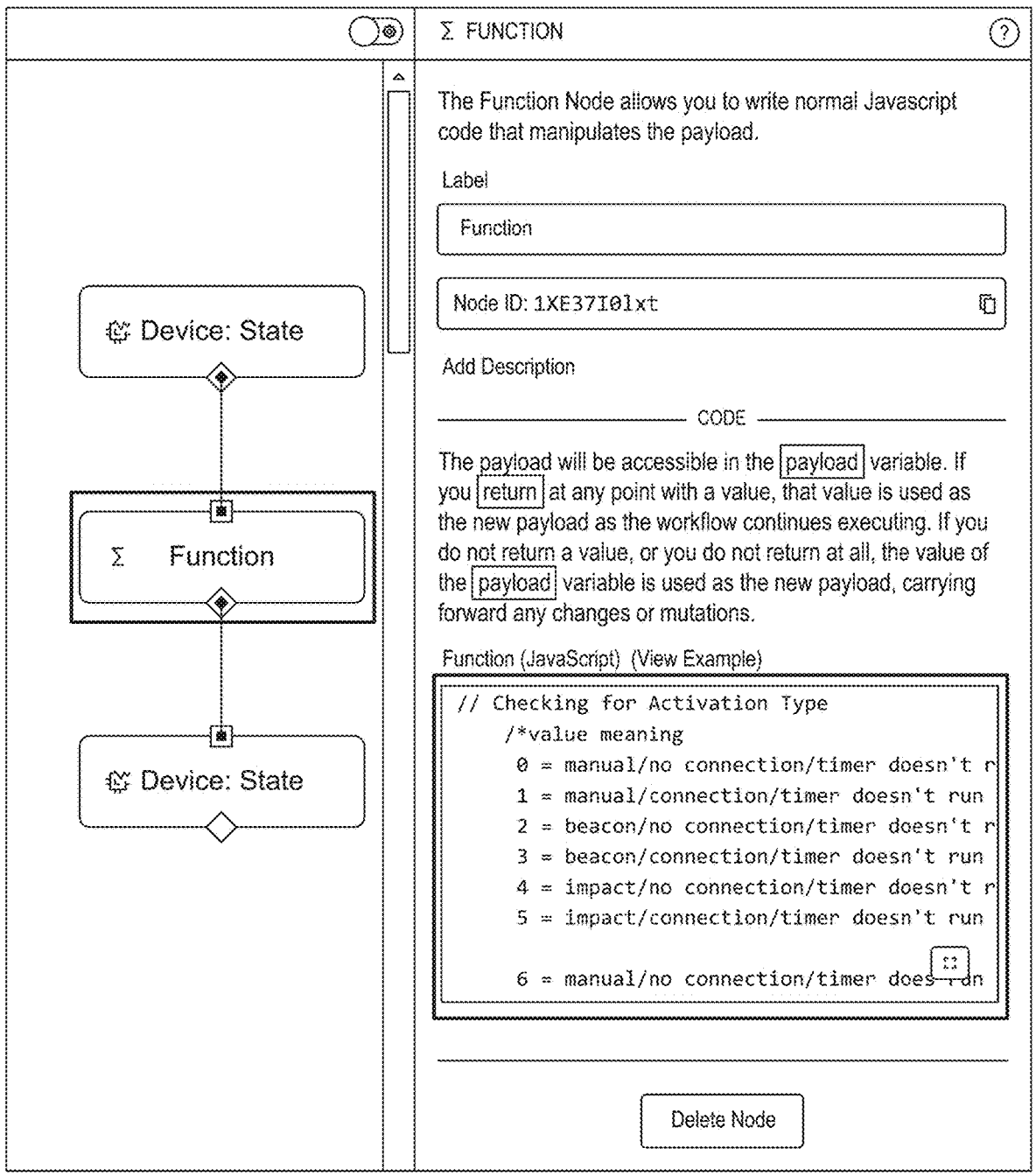
FIG. 12 depicts an example of an interface and flow diagram associated with some implementations of the present disclosure, in accordance with various embodiments.

As shown in FIG. 12, a second portion 1200 of a Losant workflow is illustrated, relating to the "Function" or manipulation of the data received regarding the devices, such as a user device 210 as detected by a rover device 100. The second portion 1200 of the Losant workflow, in this example, enables code to be written to manipulate the payload of data. The code cold be Java script, for example. As one example, the data from two or more rover devices 100 could be used for triangulation or trilateration of signals received from user devices, such as user device 210. As shown in FIG. 12, various information from the iBeacon signal such as Activation Type can be received and used by the IoT platform 312 in a Losant workflow.

Figure 13:
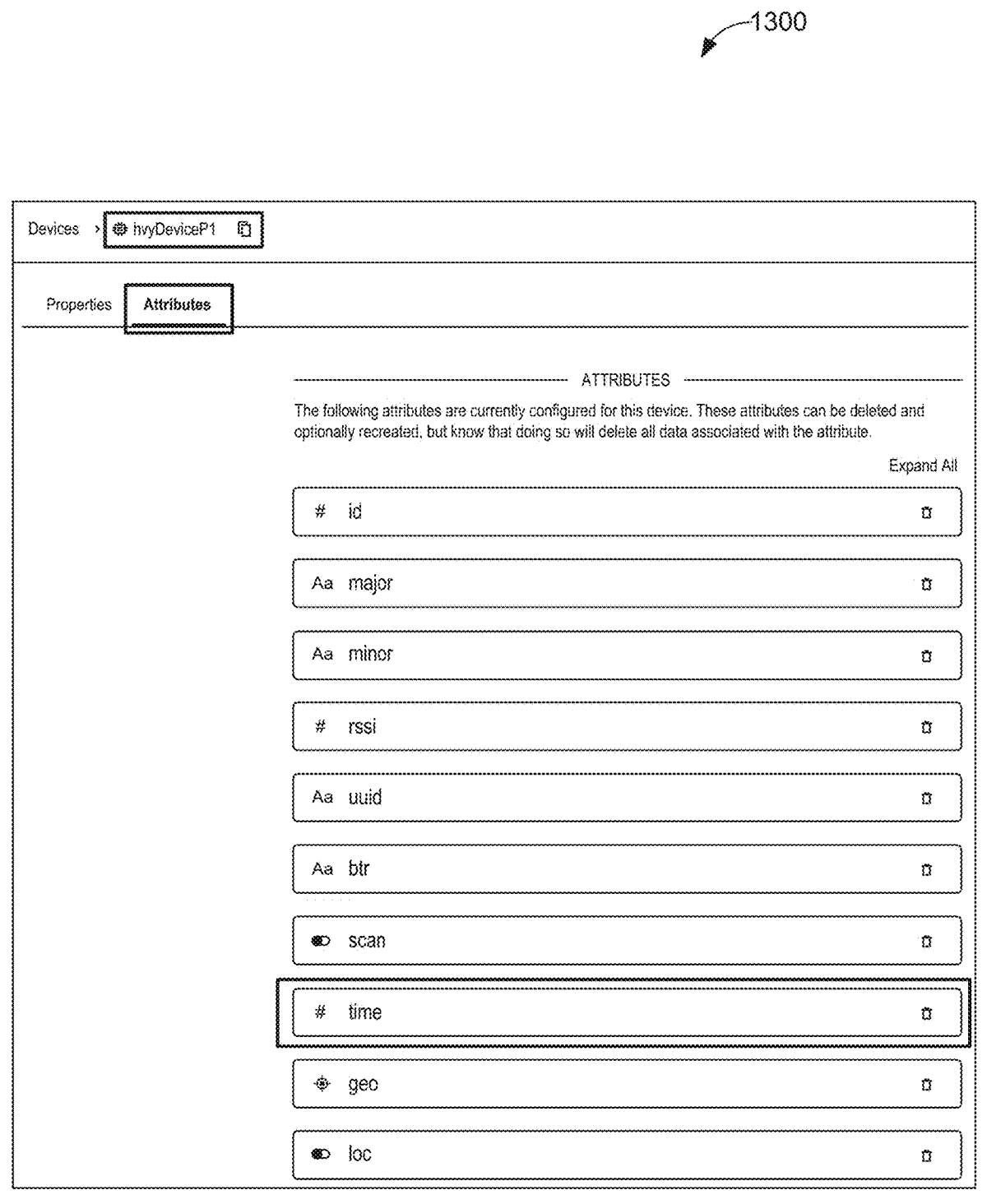

Turning to FIG. 13, an IoT platform 312 can enable an interface 1300 that provides attribute data about any devices emitting signals received by a system 300. For example, Attributes may be accessed for any device, such as a user device 210. The major and minor identifications are shown, along with a UUID aspect and a time, for example. In FIG. 14, a further interface 1400 is shown, where attributes can be defined. The interface 1400 is one example of a dashboard or other controls provided by an IoT platform 312. The data method and each attribute and corresponding value can be defined, such as a connection status ("conn"), the distance to a signal ("dist"), a geographic location, an identification, and an activation status or data.

The Losant workflow illustrated by the examples in FIGS. 11 to 12 can allow for the modification of incoming, collected data. In some cases, three devices are created from the perspective of the Losant workflow, such as a standalone device, a gateway device, and a peripheral device. The peripheral and gateway devices can both be used through the MQTT technology setup and the Argon code described herein. The devices can connect to a Losant platform (such as IoT platform 312) in order to receive data. In some cases, modified data can be pushed to a standalone device as part of the IoT platform 312. The "Function" node illustrated in FIG. 11 enables normal JavaScript to be used to manipulate data, as stated above. A language such as JavaScript can be used to calculate values. For example, time values can be accessed using "payload.data.time". Any attributes can be changed in the data by using "payload.data.[name of attribute]". The [name of attribute] can be attributes created when creating the device, or at another point in time. In one example, epoch time could be converted to local time in New York. The data can be manipulated to make changes to attributes, for example as illustrated in FIGS. 13 and 14, before data is sent to a standalone device, in embodiments.

Figure 15:
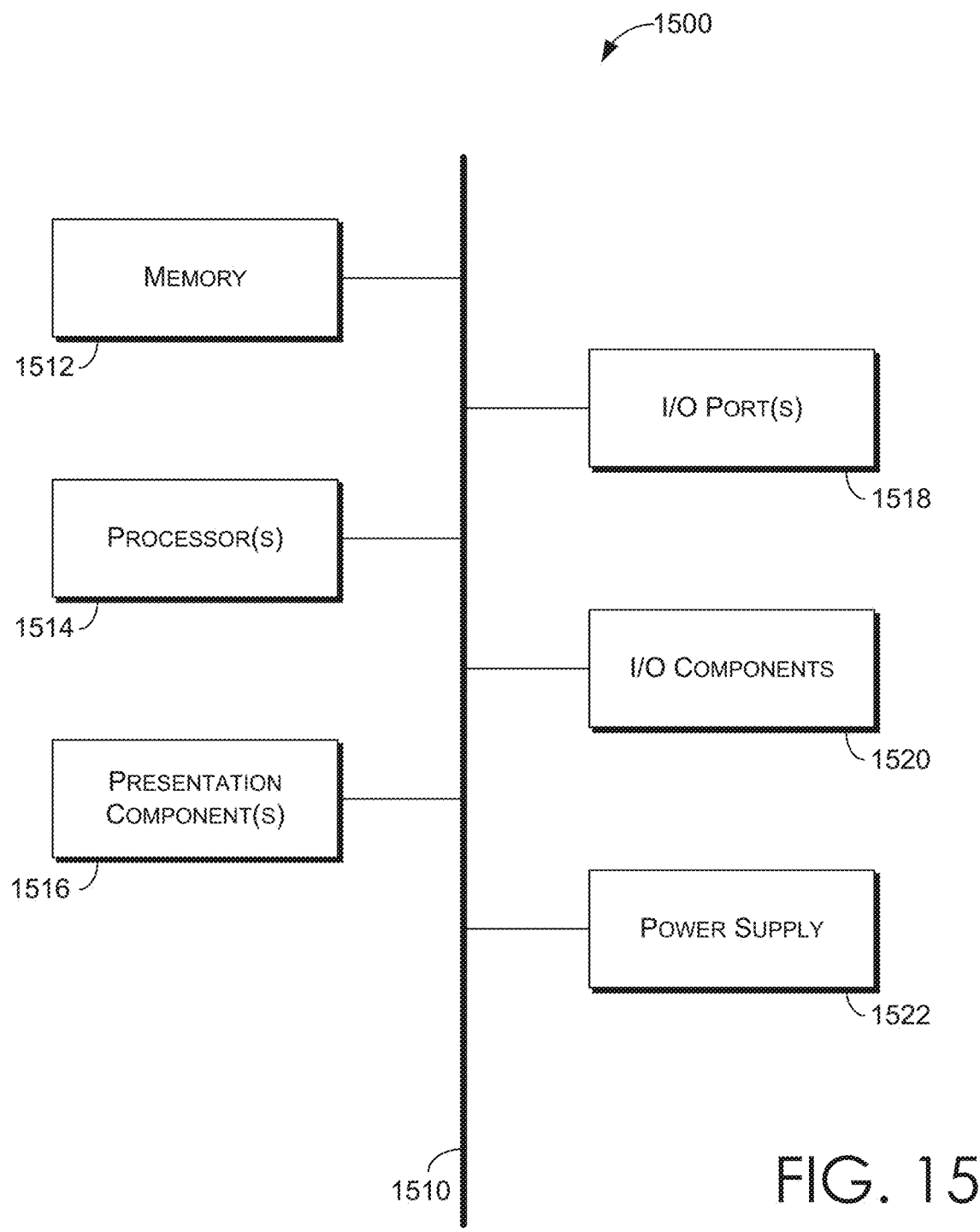
FIG. 15 provides an example of a computing device in which embodiments of the present invention may be employed.

FIG. 15 provides an example of a computing device in which embodiments of the present invention may be employed. Computing device 1500 includes bus 1510 that directly or indirectly couples the following devices: memory 1512, one or more processors 1514, one or more presentation components 1516, input/output (I/O) ports 1518, input/output components 1520, and illustrative power supply 1522. Bus 1510 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 15 is merely illustrative of an exemplary computing device that can be used in connection with one or more embodiments of the present invention. Distinction is not made between such categories as "workstation," "server," "laptop," "handheld device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1512 includes computer storage media in the form of volatile and/or nonvolatile memory. As depicted, memory 1512 includes instructions 1524. Instructions 1524, when executed by processor(s) 1514 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which may be built in. Illustrative components include a microphone, joystick, game pad, satellite dish, scanner, printer, wireless device, etc. I/O components 1520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1500. Computing device 1500 may be equipped with depth cameras, such as stereoscopic camera systems, infrared camera systems, RGB camera systems, and combinations of these, for gesture detection and recognition. Additionally, computing device 1500 may be equipped with accelerometers or gyroscopes that enable detection of motion. The output of the accelerometers or gyroscopes may be provided to the display of computing device 1500 to render immersive augmented reality or virtual reality.

Embodiments described herein enable users of electronic devices, such as phones, to coordinate their resources while waiting for contact or rescue. This conservation of resources can include utilizing a round robin configuration for sending of signals, dimming screens for example by using black backgrounds on an interface, and using low-energy Bluetooth, for example. In some cases, one or more users may not be responsive, but the set of devices associated with the users may have the system 300 activated because the users suffered an impact. The electronic devices of the users may automatically open a user application and countdown to an automatic request for services.

In another example, a single individual may be in a wooded area or another area with obstacles or obstructions to a search operation. The individual may select to initiate the system 300 using their mobile device, or the individual may fall or suffer some other event that causes the phone to detect an impact. Emergency responders could locate the individual, based on their mobile device emitting a low energy Bluetooth signal or a beacon, for example, which can be detected. The responders may or may not deploy rover devices during the search, depending on the terrain, the available resources, and/or the potential for hazardous conditions.

As another example, a group exploring a remote area may suffer some type of chemical exposure, and many members of the group may be non-responsive. An individual within the group may activate a user application to call for help and conserve power. The phones of the other members of the group may detect the initial individual's use of the application, for example due to a beacon being used with particular major and minor identifications. The phones of the other group members, which also contain the application, may automatically be triggered to open the application or otherwise convert into an activated emergency mode. This can cause the group's phones to coordinate sending out a signal for detection by rescuers, even though many members of the group are not responsive. The phones can also create a mesh network, for example, to automatically communicate with each other and/or to extend any network connections to the group.

Figure 16:
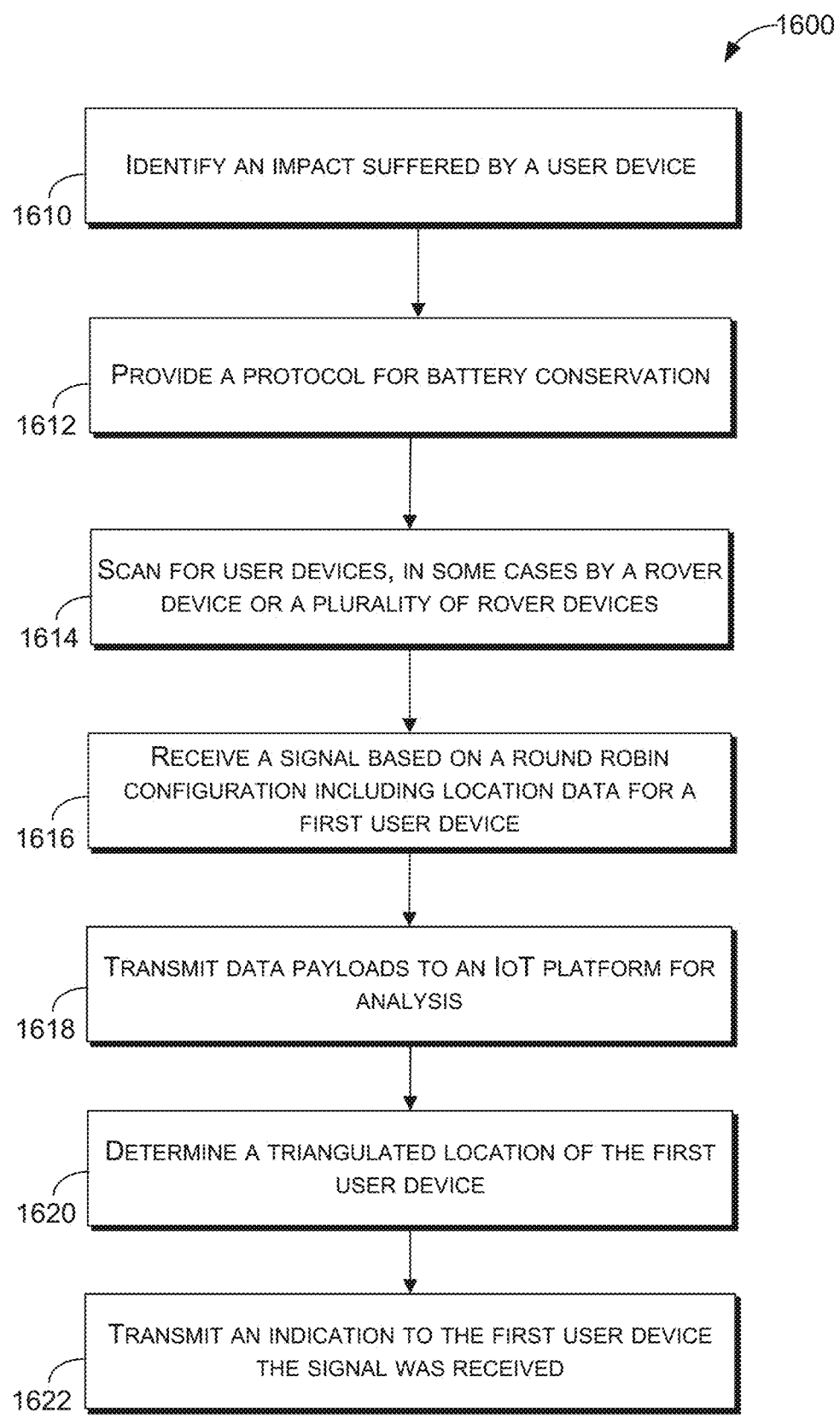
FIG. 16 depicts a flow diagram associated with some implementations of the present disclosure, in accordance with various embodiments.

FIG. 16 depicts a flow diagram 1600 associated with some implementations of the present disclosure, in accordance with various embodiments. Embodiments can include, for example, identifying an impact suffered by a user device, as illustrated at 1610. A protocol may be provided for battery conservation, for example to dim the interface and/or to transmit signals in a round robin configuration, as shown at 1612. At 1614, an embodiment can scan for user devices, in some cases by a rover device or a plurality of rover devices. At 1616, a signal can be received based on a round robin configuration among various user devices, including a first user device. As shown at 1618, data payloads relating to the user devices can be transmitted to a platform, such as an IoT platform, for analysis and use by a system, such as system 300. At 1620, a triangulated location of a first user device can be determined. In some cases, a trilateration value may also be determined for one or more user devices, for example using data from two or more rovers, as aggregated and analyzed at an IoT platform (such as IoT platform 312, for example). At 1622, an indication is transmitted to the first user device that the signal was received. For example, an indication can express to a user device (such as user device 210) that help is on its way.

Figure 18A:
FIGS. 18A and 18B depict examples of portions of code used by devices, such as a rover device, in accordance with some embodiments of the present invention.
Figure 18B:

As described above, FIGS. 17A and 17B depict examples (e.g., 1700A and 1700B, respectively) of portions of code used by devices, such as a rover device, in accordance with some embodiments of the present invention. FIGS. 18A and 18B also depicts examples (e.g., 1800A and 1800B, respectively) of portions of code used by devices, such as a rover device, in accordance with some embodiments of the present invention. Embodiments presented herein have been described in relation to particular embodiments, which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more computer storage media storing computer-useable instructions that, when used by one or more computing devices, cause the one or more computing devices to perform operations comprising:
    providing an interface for a first electronic device, including a countdown to emitting a beacon signature from the first electronic device, wherein the countdown expires, causing the beacon signature to be emitted, and the beacon signature activates an application at a second electronic device;
    providing a protocol for the first electronic device and the second electronic device to compare a first battery power of the first electronic device and a second battery power of the second electronic device, wherein the first electronic device and the second electronic device collaborate by analyzing which of the first electronic device and the second electronic device should emit the beacon signature based on a first remaining power level associated with the first device and a second remaining power level associated with the second device;
    receiving, at a networked device in a wireless network, an indication of a beacon signature and associated data from a first remote device, wherein the first remote device detects the beacon signature from the first electronic device; and
    determining, at the networked device in the wireless network, a start time associated with the beacon signature based on the associated data.

2. The one or more computer storage media of claim 1 wherein the protocol further includes applying a user interface for the first electronic device with a dark background.

3. The one or more computer storage media of claim 2, wherein the protocol further includes rotating the emitting of the beacon signature, such that the first electronic device continues to emit the beacon signature until the first electronic device reaches a first battery power level threshold, followed by the second electronic device emitting a second beacon signature until the second electronic device reaches a second battery power level threshold.

4. The one or more computer storage media of claim 1, wherein the first remote device detects the beacon signature from the first electronic device by scanning for a Bluetooth signal.

5. The one or more computer storage media of claim 4, wherein the Bluetooth signal is a low energy Bluetooth signal.

6. The one or more computer storage media of claim 1, further comprising:
determining a location of the first electronic device based on the associated data.

7. The one or more computer storage media of claim 1, wherein the first remote device is a rover device.

8. The one or more computer storage media of claim 1, wherein the beacon signature comprises iBeacon data.

9. A method comprising:
providing an interface for a first electronic device, including a countdown to emitting a beacon signature from the first electronic device, wherein the countdown expires, causing the beacon signature to be emitted, and the beacon signature activates an application at a second electronic device;
providing a protocol for the first electronic device and the second electronic device to compare a first battery power of the first electronic device and a second battery power of the second electronic device, wherein the first electronic device and the second electronic device collaborate by analyzing which of the first electronic device and the second electronic device should emit the beacon signature based on a first remaining power level associated with the first device and a second remaining power level associated with the second device;
receiving, at a networked device in a wireless network, an indication of a beacon signature and associated data from a first remote device, wherein the first remote device detects the beacon signature from the first electronic device; and
determining, at the networked device in the wireless network, a start time associated with the beacon signature based on the associated data.

10. The method of claim 9 wherein the protocol further includes applying a user interface for the first electronic device with a dark background.

11. The method of claim 10, wherein the protocol further includes rotating the emitting of the beacon signature, such that the first electronic device continues to emit the beacon signature until the first electronic device reaches a first battery power threshold, followed by the second electronic device emitting a second beacon signature until the second electronic device reaches a second battery power threshold.

12. The method of claim 9, wherein the first remote device detects the beacon signature from the first electronic device by scanning for a Bluetooth signal.

13. The method of claim 12, wherein the Bluetooth signal is a low energy Bluetooth signal.

14. The method of claim 9, further comprising:
determining a location of the first electronic device based on the associated data.

15. The method of claim 9, wherein the first remote device is a rover device.

16. The method of claim 9, wherein the beacon signature comprises iBeacon data.

17. A system comprising:
one or more processors; and
one or more computer storage media storing computer-executable instructions that, when executed by the one or more processors, implement a method comprising:
providing an interface for a first electronic device, including a countdown to emitting a beacon signature from the first electronic device, wherein the countdown expires, causing the beacon signature to be emitted, and the beacon signature activates an application at a second electronic device;
providing a protocol for the first electronic device and the second electronic device to compare a first battery power of the first electronic device and a second battery power of the second electronic device, wherein the first electronic device and the second electronic device collaborate by analyzing which of the first electronic device and the second electronic device should emit the beacon signature based on a first remaining power level associated with the first device and a second remaining power level associated with the second device;
receiving, at a networked device in a wireless network, an indication of a beacon signature and associated data from a first remote device, wherein the first remote device detects the beacon signature from the first electronic device; and
determining, at the networked device in the wireless network, a start time associated with the beacon signature based on the associated data.

18. The system of claim 17 wherein the protocol further includes applying a user interface for the first electronic device with a dark background.

19. The system of claim 18, wherein the protocol further includes rotating the emitting of the beacon signature, such that the first electronic device continues to emit the beacon signature until the first electronic device reaches a first battery power threshold, followed by the second electronic device emitting a second beacon signature until the second electronic device reaches a second battery power threshold.

20. The system of claim 17, wherein the first remote device detects the beacon signature from the first electronic device by scanning for a Bluetooth signal.

* * * * *